UNITED STATES PATENT OFFICE.

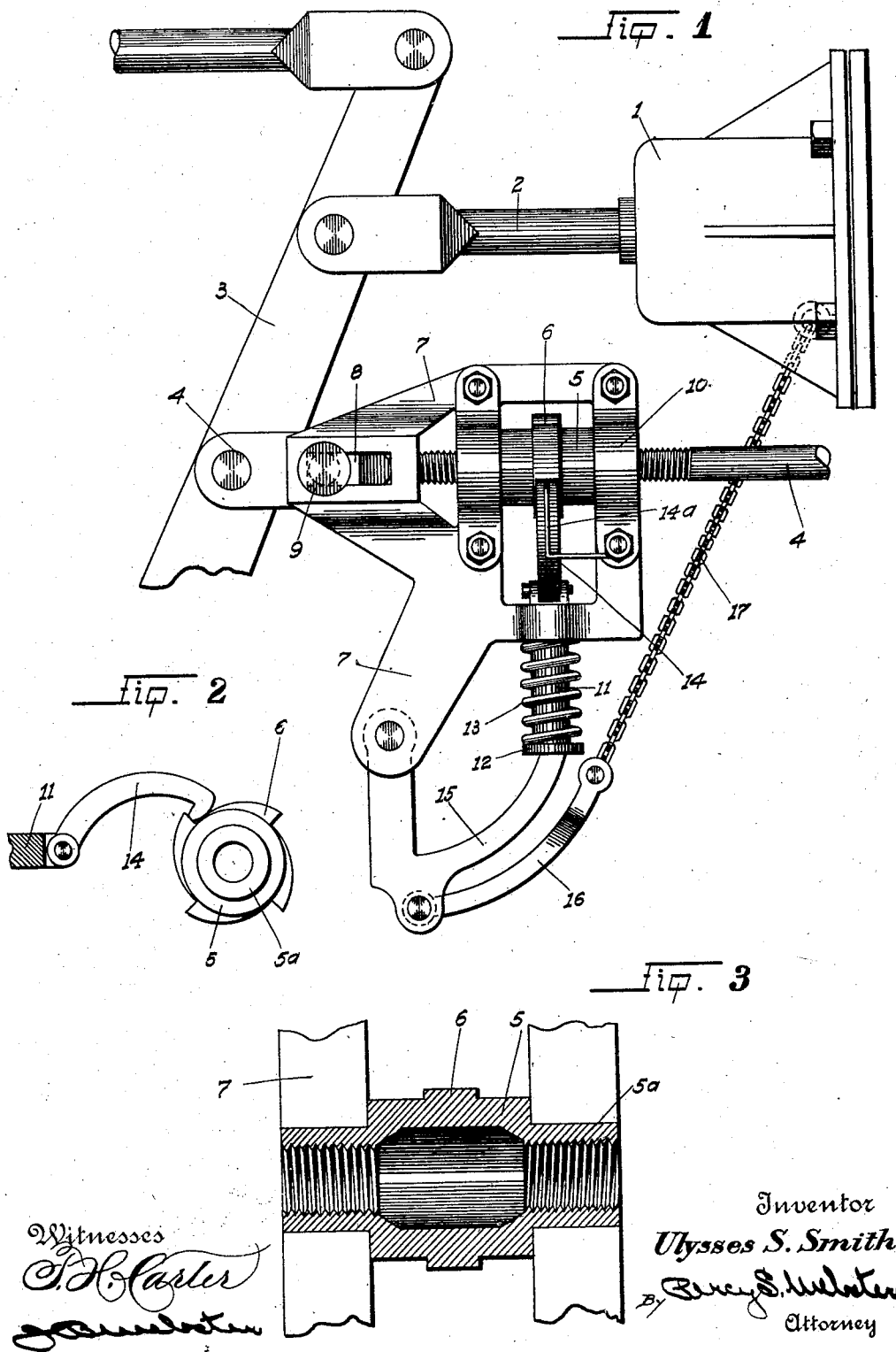

ULYSSES S. SMITH, OF SACRAMENTO, CALIFORNIA.

AUTOMATIC SLACK-ADJUSTER FOR AIR-BRAKE SYSTEMS.

No. 918,922.  Specification of Letters Patent.  Patented April 20, 1909.

Application filed August 12, 1908. Serial No. 448,181.

*To all whom it may concern:*

Be it known that I, ULYSSES S. SMITH, a citizen of the United States, residing at Sacramento, in the county of Sacramento, State of California, have invented certain new and useful Improvements in Automatic Slack-Adjusters for Air-Brake Systems; and I do declare the following to be a full, clear, and exact description of the same, such as will enable others skilled in the art to which it appertains to make and use the same, reference being had to the accompanying drawings, and to the characters of reference marked thereon, which form a part of this specification.

This invention relates to improvements in air brake systems, the object of the invention being to take up the increased travel caused by the wear of the brake shoes against the wheels, and to permit of a regular and equal stroke of the brake piston. The aim of the invention is to do this automatically and with the least possible mechanism and expense. This object I accomplish by means of a turn buckle disposed at an intermediate point in one of the brake rods, such turnbuckle having ratchets formed thereon, said rod carrying a movable frame holding a spring actuated dog engaging said ratchets, said frame carrying a lever so positioned and connected with said dog as to cause said dog or pawl to operate said ratchet carrying turnbuckle to shorten said brake rod where a predetermined movement of the brake piston is reached; also by such other and further construction and relative arrangement of parts as will appear by a perusal of the following specification and claims.

In the drawings similar characters of reference indicate corresponding parts in the several views.

Figure 1 is a top plan view of the complete device. Fig. 2 is a side elevation of a ratchet and pawl mechanism. Fig. 3 is a sectional view of a turnbuckle and ratchet mechanism.

Referring now more particularly to the characters of reference on the drawings 1 designates a brake cylinder of an air brake system and 2 the brake piston rod thereon, while 3 is the brake lever and 4 one of the brake rods thereon in which brake rod 4 at an intermediate point is a turnbuckle 5 having ratchets 6 formed on its outer periphery.

7 is a frame member having a slot 8 slidably disposed over a bolt 9 on the rod 4, such member 7 having a bifurcated member 10 in which is journaled the turnbuckle 5 by means of shoulders $5^a$. Slidably disposed through the bottom of the member 10 is a pin 11 having a top collar 12 there being a spring 13 bearing between the member 10 and the collar 12. A dog 14 is pivoted to the inner end of the pin 11 and normally engages the ratchets 6.

An angular link 15 is pivoted to the member 7 and engages the pin 11 and has an arm 16 from which a chain 17 is fastened to any stationary point on the car such as the head of the brake cylinder 1.

In practice when the brakes are set and the rod 2 moves outward beyond a predetermined point, say the normal stroke of eight inches, the chain 17 draws tight and causes the link 15 to drive the pin 11 and dog 14 inward thereby engaging one of the ratchets 6. Then the brakes are released and the rod 2 moves inward thus permitting the chain 17 and link 15 to loosen, whereupon the spring 13 returns the pin 11 and dog 14 to normal position thereby causing a turn of the turnbuckle 5, thus taking up or shortening the rod 4 which of course takes up the slack in the brake shoes occasioned by the friction and wear of the same against the wheels which causes the extra length of stroke of the rod 2, as described.

By reason of the slot 8 and bolt 9 the frame 7 and its parts remain in a fixed position the rod 4 moving therethrough by means of said slot mechanism.

From the foregoing description it will be readily seen that I have produced a slack adjuster which substantially fulfils the objects of the invention as set forth herein.

While this specification sets forth in detail the present and preferred construction of the device, still in practice such deviations from such detail may be resorted to as do not form a departure from the spirit of the invention.

Having thus described the invention, what I claim as new and useful and desire to secure by Letters Patent is:—

1. A slack adjuster comprising the combination of a brake system, a rod therein, a frame movable on said rod, a turnbuckle in said frame, a spring actuated pawl engaging said turnbuckle, and a flexible member connection with said pawl and being fixedly secured with respect to the cylinder of said brake system, as set forth.

2. In a device of the character described, a brake system, a rod therein, a turnbuckle at an intermediate point in said rod, a member stationary with respect to the brake cylinder of said system and means on said stationary member for operating such turnbuckle when said rod makes a predetermined movement, as described.

3. In a device of the character described a brake system, a rod therein, a turnbuckle at an intermediate point in said rod, ratchets on said turnbuckle, a frame movable on said rod, a pawl movable in said frame and engaging said ratchets, a member fixed stationary with respect to the movement of said rod, and means on said stationary member for operating said pawl when said rod makes a predetermined movement, as set forth.

In testimony whereof I affix my signature in presence of two witnesses.

ULYSSES S. SMITH.

Witnesses:
HENRY G. LONGHURST,
HEDING J. ANDERSON.